(12) United States Patent
Chang et al.

(10) Patent No.: US 10,616,411 B1
(45) Date of Patent: Apr. 7, 2020

(54) SYSTEM AND METHOD FOR INTELLIGENT CALL INTERCEPTION AND FRAUD DETECTING AUDIO ASSISTANT

(71) Applicant: Wells Fargo Bank, N.A., San Francisco, CA (US)

(72) Inventors: Michael H. Chang, Millbrae, CA (US); Kevin R. Cieslak, Novato, CA (US); Jeffrey A. Cornman, San Francisco, CA (US); Chris Kalaboukis, San Jose, CA (US); Beth S. Moss, Danville, CA (US); Christina Zappala Ongpin, Burlingame, CA (US); Ramanathan Ramanathan, Bellevue, WA (US); Darrell L. Suen, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/681,759

(22) Filed: Aug. 21, 2017

(51) Int. Cl.
```
G06N 7/00       (2006.01)
G06N 99/00      (2019.01)
G10L 15/26      (2006.01)
G10L 15/18      (2013.01)
H04M 3/436      (2006.01)
H04M 3/42       (2006.01)
```
(Continued)

(52) U.S. Cl.
CPC .......... *H04M 3/436* (2013.01); *H04M 1/663* (2013.01); *H04M 3/2281* (2013.01); *H04M 3/42059* (2013.01); *G06Q 20/4016* (2013.01); *H04M 3/20* (2013.01); *H04M 3/42153* (2013.01); *H04M 3/54* (2013.01); *H04M 2201/40* (2013.01); *H04M 2201/41* (2013.01); *H04M 2203/558* (2013.01)

(58) Field of Classification Search
CPC ........ G06Q 50/01; G06Q 99/00; G01L 17/00; G01L 17/005; G01L 17/04; G01L 63/18; G01L 63/083; G01L 63/0876; G01L 9/3215; G01L 9/3271; H01J 37/32266; H04K 1/00; H04L 65/1076; H04L 63/0428; H04M 2203/6027; H04M 3/2218; H04M 7/0078; H04M 15/00; H04M 15/47; H04M 2215/0148; H04M 3/36; G10L 17/00; G10L 17/005; G10L 17/04; G10L 63/18; G10L 63/083; G10L 63/0876; G10L 9/3215; G10L 9/3271
USPC ................................ 379/114.01, 114.14, 145
See application file for complete search history.

(56) References Cited

U.S. PATENT DOCUMENTS 5,627,886 A    5/1997  Bowman
5,907,602 A *  5/1999  Peel .................... H04M 3/36
                                              379/114.14
(Continued)

FOREIGN PATENT DOCUMENTS

WO    WO-2012/075323 A1    6/2012

*Primary Examiner* — Binh Kien Tieu
(74) *Attorney, Agent, or Firm* — Foley & Lardner LLP (57) ABSTRACT

A fraud analysis computing system is provided. The system includes a network interface configured to communicate data over a network and a processing circuit including one or more processors coupled to non-transitory memory. The processing circuit is configured to monitor incoming call data generated during an incoming call between a user and an incoming caller, detect a fraud trigger within the incoming call data, and complete a fraud interception activity in response to detection of the fraud trigger.

15 Claims, 5 Drawing Sheets

(51) Int. Cl.
*H04M 1/663* (2006.01)
*H04M 3/22* (2006.01)
*G06Q 20/40* (2012.01)
*H04M 3/20* (2006.01)
*H04M 3/54* (2006.01)

(56) References Cited

U.S. PATENT DOCUMENTS

| | | | | |
|---|---|---|---|---|
| 5,974,142 | A * | 10/1999 | Heer | H04K 1/00 379/442 |
| 6,157,707 | A * | 12/2000 | Baulier | H04M 3/36 379/145 |
| 8,417,600 | B2 | 4/2013 | Degen et al. | |
| 8,606,712 | B2 | 12/2013 | Choudhuri et al. | |
| 8,949,150 | B2 | 2/2015 | Siddens et al. | |
| 9,010,633 | B2 | 4/2015 | Hogg et al. | |
| 9,049,117 | B1 * | 6/2015 | Nucci | H04L 63/302 |
| 9,113,001 | B2 | 8/2015 | Rajakumar et al. | |
| 9,390,418 | B2 | 7/2016 | Gavan et al. | |
| 9,774,726 | B1 * | 9/2017 | Jenkins | H04M 3/2281 |
| 2008/0086770 | A1 * | 4/2008 | Kulkarni | H04L 63/0876 726/20 |
| 2008/0195387 | A1 * | 8/2008 | Zigel | G10L 17/06 704/236 |
| 2009/0222308 | A1 | 9/2009 | Zoldi et al. | |
| 2009/0307028 | A1 | 12/2009 | Eldon et al. | |
| 2010/0228656 | A1 * | 9/2010 | Wasserblat | G06Q 10/10 705/35 |
| 2012/0130853 | A1 | 5/2012 | Petri et al. | |
| 2012/0296692 | A1 | 11/2012 | O'Malley et al. | |
| 2013/0218758 | A1 | 8/2013 | Koenigsbrueck et al. | |
| 2013/0282583 | A1 | 10/2013 | Siddens et al. | |
| 2014/0058763 | A1 | 2/2014 | Zizzamia et al. | |
| 2014/0181898 | A1 * | 6/2014 | Apparao | G06Q 10/06 726/1 |
| 2014/0201076 | A1 | 7/2014 | Pacher et al. | |
| 2014/0250011 | A1 | 9/2014 | Weber | |
| 2015/0117439 | A1 * | 4/2015 | Efrati | H04L 65/1079 370/352 |
| 2015/0170147 | A1 | 6/2015 | Geckle et al. | |
| 2016/0044048 | A1 | 2/2016 | Hamidi et al. | |
| 2016/0142534 | A1 * | 5/2016 | Guerra | G06Q 50/01 379/88.02 |
| 2016/0255194 | A1 * | 9/2016 | Efrati | H04L 65/1079 370/259 |
| 2017/0270627 | A1 * | 9/2017 | Hodge | H04M 3/42221 |
| 2018/0020093 | A1 * | 1/2018 | Bentitou | H04M 3/4365 |
| 2018/0240028 | A1 * | 8/2018 | Baracaldo Angel | H04L 63/1408 |
| 2019/0020759 | A1 * | 1/2019 | Kuang | H04W 12/00 |

\* cited by examiner

SYSTEM AND METHOD FOR INTELLIGENT CALL INTERCEPTION AND FRAUD DETECTING AUDIO ASSISTANT

TECHNICAL FIELD

The present invention relates generally to the field of monitoring and intercepting telephone calls received by a user that are determined to be fraudulent or risky.

BACKGROUND

As fraudsters increasingly target the aging population, it is important to provide safeguards tailored to the particular risks faced by this population. Because the aging population is more likely to live alone, often within diminished capacities and fewer connections to the outside world than the general population, they are particularly susceptible to fraud schemes perpetrated via telephone. Telephone fraud schemes are particularly dangerous because fraudsters may conceal or misrepresent their identities in order to induce the recipient of the call to complete a fraudulent transaction or to take a risky action. For example, the fraudster may trick the recipient of the call into divulging the recipient's social security number or a personal identification number (PIN). Accordingly, it would be beneficial to provide a call interception and fraud detection system that both screens likely fraudulent callers from recipients and interrupts the call if risky or fraudulent activity is likely to occur.

SUMMARY

One embodiment of the present disclosure relates to a fraud analysis computing system. The system includes a network interface that communicates data over a network and a processing circuit that includes one or more processors coupled to non-transitory memory. The processing circuit is configured to monitor incoming call data generated during an incoming call between a user and an incoming caller, detect a fraud trigger within the incoming call data, and complete a fraud interception activity in response to detection of the fraud trigger.

Another embodiment of the present disclosure relates to computer-implemented method. The method includes monitoring incoming call data generated during an incoming call between a user and an incoming caller, detecting a fraud trigger within the incoming call data; and completing a fraud interception activity in response to detection of the fraud trigger.

Another embodiment of the present disclosure relates to a call intercept hardware device that is coupled to a landline telephone device and a telephone jack. The call intercept hardware device includes a network interface that communicates data over a network and a processing circuit that includes one or more processors coupled to non-transitory memory. The processing circuit is configured to monitor incoming call data generated during an incoming call between a user and an incoming caller, detect a fraud trigger within the incoming call data, and transmit the incoming call data to a fraud analysis computing system in response to detection of the fraud trigger.

These and other features, together with the organization and manner of operation thereof, will become apparent from the following detailed description when taken in conjunction with the accompanying drawings.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

DETAILED DESCRIPTION

Referring generally to the figures, various systems, methods, and apparatuses related to a call intercept and fraud detection system are described.

According to various example embodiments, as described in further detail below, real-time monitoring of incoming calls and immediate action may be taken in response to detection that fraudulent or risky activity is likely to occur. Traditional solutions may permit a user to flag a caller as fraudulent, but this at best mitigates damage after fraud has already occurred. Using the system described herein, an incoming call undergoes multiple levels of screening before the incoming call is connected to the user. In addition, an active monitoring system protects the user during the call by completing a variety of interception activities (e.g., disconnecting the call, muting the call, alerting a caregiver of the user, alerting a financial institution of the user) as soon as potentially fraudulent or risky activity is detected.

An example implementation may be described as follows. A caller makes an incoming call to a user. The call is intercepted either by a fraud detection application installed on a smartphone or by a hardware device that is plugged in between a landline telephone and a telephone jack. The smartphone application and/or the hardware device are configured to connect to a fraud analysis computing system and to transmit incoming call envelope data (e.g., a phone number, an area code, an identity of a person or entity associated with the phone number, a voiceprint) to the fraud analysis computing system. As a first filtering mechanism, the fraud analysis computing system analyzes the incoming call envelope data against phone numbers, individuals, and locations either known to be or having a high probability of being fraudulent.

If the fraud analysis computing system determines that the incoming call is legitimate within a specific percentage of certainty, the fraud analysis computing system connects to the incoming call and a fraud conversation circuit converses with the caller as a second filtering mechanism. At the conclusion of the conversation, if the fraud analysis computing system again determines that the incoming call is legitimate within a specific percentage of certainty, the fraud analysis computing system transmits a signal via the smartphone application or the hardware device for the user to pick up the incoming call. While the user converses with the incoming caller, the smartphone application or the hardware device transmits real time data for monitoring purposes to the fraud analysis computing system. If the fraud analysis computing system detects a fraud trigger in the real time data (e.g., if the incoming caller requests that the user provide a PIN or social security number, if the incoming caller prompts the user to complete a harmful transaction), the fraud analysis computing system completes a call interception activity.

Figure 1:
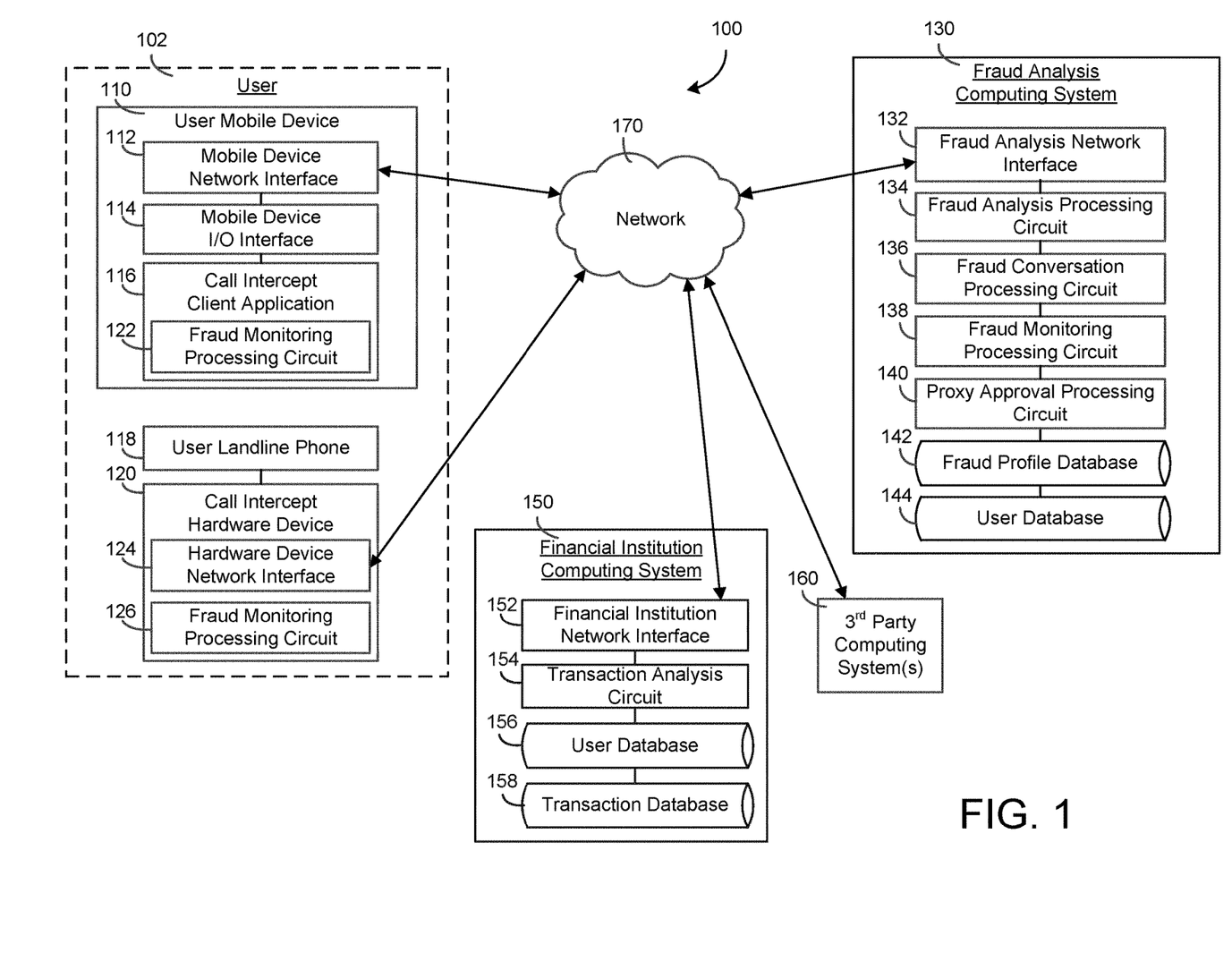
FIG. 1 is a schematic diagram of a computer-implemented call intercept and fraud detection system, according to an example embodiment.

Referring now to FIG. 1, a block diagram of a call intercept and fraud detection system 100 is shown, according to an example embodiment. The system 100 includes a user 102 with a user mobile device 110 and/or a user landline phone 118, a fraud analysis computing system 130, a financial institution computing system 150, and a third party computing system 160. Various components of the system 100 communicate with one another over a network 170. The network 170 is a data exchange medium, which may include wireless networks (e.g., cellular networks, Bluetooth®, WiFi, Zigbee®), wired networks (e.g., Ethernet, DSL, cable, fiber-based), or a combination thereof. In some arrangements, the network 170 includes the internet.

The user mobile device 110 is a computing device associated with a user 102. The user 102 is any entity capable of receiving incoming telephone calls. The user 102 may include both individuals and organizations. In some arrangements, the user 102 is associated with a telephone number to which incoming calls are directed. In some arrangements, the user 102 is an elderly or disabled person whose affairs are generally managed by a caretaker, guardian, family member, or proxy. In various arrangements, the user 102 or entity associated with the user 102 holds or is otherwise associated with an account at the financial institution computing system 150.

The user mobile device 110 includes any type of computing device capable of receiving telephone calls and communicating information both to and from the fraud analysis computing system 130. The user mobile device 110 includes wearable and non-wearable devices. Wearable devices refer to any type of device that an individual wears including, but not limited to, a watch (e.g., smart watch), glasses (e.g., eye glasses, sunglasses, smart glasses), bracelet (e.g., a smart bracelet), etc. The user mobile device 110 also includes any type of non-wearable device including, but not limited to, a phone (e.g., smart phone, etc.), a tablet, and a personal digital assistant.

In the example embodiment shown, the user mobile device 110 includes a mobile device network interface 112 enabling the user mobile device 110 to exchange information over the network 170, a call intercept client application 116, and a mobile device input/output (I/O) interface 114. The mobile device I/O interface 114 includes hardware and associated logics configured to enable the user mobile device 110 to exchange information with the user 102, the fraud analysis computing system 130, the financial institution computing system 150, and the third party computing system 160, as will be described in greater detail below. An input device or component of the mobile device I/O interface 114 allows the user 102 to provide information to the user mobile device 110, and may include, for example, a mechanical keyboard, a touchscreen, a microphone, a camera, a fingerprint scanner, any user input device engageable with the user mobile device 110 via a universal serial bus (USB) cable, serial cable, Ethernet cable, and so on. An output device or component of the mobile device I/O interface 114 allows the user 102 to receive information from the user mobile device 110, and may include, for example, a digital display, a speaker, illuminating icons, light emitting diodes (LEDs) and the like.

The call intercept client application 116 is structured to assist the user 102 in monitoring and intercepting fraudulent incoming calls. In this regard, the call intercept client application 116 is communicably coupled to the fraud analysis computing system 130, the financial institution computing system 150, and the third party computing system 160. In some embodiments, the call intercept client application 116 is a separate software application implemented on the user mobile device 110. The call intercept client application 116 may be downloaded by the user mobile device 110 prior to its usage, hard coded into the memory of the user mobile device 110, or accessible as a web-based interface application such that the user 102 accesses the call intercept client application 116 via a web browsing application. In this latter instance, the call intercept client application 116 may be supported by a separate computing system including one or more servers, processors, network interface circuits, etc., that transmit applications for use to the user mobile device 110. In certain embodiments, the call intercept client application 116 includes an application programming interface (API) and/or a software development kit (SDK) that facilitates the integration of other applications.

Irrespective of the form that the call intercept client application 116 takes, the call intercept application 116 is structured to transmit and receive data from the fraud analysis computing system 130 via the network 170. Further details of these interactions are provided below with reference to FIGS. 2-3. In some arrangements, the data from the fraud analysis computing system 130 includes a command to perform a call interception activity. In various arrangements, the call intercept client application 116 is also configured to provide displays to the user mobile device 110 that assist the user 102 and/or the user's caretaker in analyzing and intercepting fraudulent callers. Examples of client application user interfaces are described in further detail below with reference to FIGS. 4-5.

In some arrangements, the user 102 owns a user landline phone 118 in addition to or in place of the user mobile device 110. The landline phone 118, which may alternatively be referred to as a land-line, fixed line, or wireline, refers to any telephone device that uses a metal wire or fiber optic telephone line for transmission, rather than a cellular network and radio waves for transmission. A call intercept hardware device 120 is connected between the user landline phone 118 and the connection point to the metal wire or fiber optic telephone line (e.g., a phone jack). The call intercept hardware device 120 is configured to transmit and receive data from the fraud analysis computing system 130 via a hardware device network interface 124 that enables the call intercept hardware device 120 to communicate over the network 170.

Both the user mobile device 110 and the call intercept hardware device 120 are shown to include a fraud monitoring processing circuit 122 and 126. Both the processing circuits 122 and 126 may consist of one or more processors coupled to memory. Each processor may be implemented as one or more application specific integrated circuits (ASICs), field programmable gate arrays (FPGAs), a group of processing components, or other suitable electronic processing components. The memory may be one or more devices (e.g., RAM, ROM, Flash memory, hard disk storage) for storing data and/or computer code for completing and/or facilitating the various processes described herein. The memory may be or include non-transient volatile memory, non-volatile memory, and non-transitory computer storage media. The memory may include database components, object code components, script components, or any other type of information structure for supporting the various activities and information structures described herein. The memory is communicably coupled to the processor and includes computer code or instructions for executing one or more processes described herein.

The fraud monitoring processing circuit 122 of the call intercept client application 116 and the fraud monitoring processing circuit 126 of the call intercept hardware device 120 are configured to perform monitoring functions of incoming calls between an incoming caller and the user 102. In some arrangements, these monitoring functions include performing a call intercept activity when a fraud trigger is detected. In other arrangements, these monitoring functions include transmitting data regarding the incoming call to another component of the call intercept and fraud detection system 100 (e.g., the fraud analysis computing system 130). As used herein, a "fraud trigger" is any event that causes any component of the call intercept and fraud detection system 100 to take action to impede, end, or mitigate the results of an incoming call. For example, in various arrangements, a fraud trigger may include, but is not limited to, a match between incoming call data and data stored in a fraud profile and/or speaking a word or phrase that indicates a high likelihood of fraudulent or risky activity (e.g., "social security number," "SSN," "personal identification number," "PIN," "account number," "routing number," "credit card number," "debit card number," "Internal Revenue Service," "IRS," "government authorized store," "tax payment," "immediate payment," "you owe," "you must pay," "forcefully recover," "frozen," "confiscated," "garnished," "seized," "crime," "maximum sentence," "maximum penalty," "arrest warrant," "jail," "sheriff," "you have won," "gift card," "opportunity of a lifetime").

As used herein, a "call intercept" or "fraud intercept" activity is any action taken in response by any component of the call intercept and fraud detection system 100 to impede, end, or mitigate a detected fraudulent caller or potentially risky activity. For example, in various arrangements, an intercept activity may include, but is not limited to, disconnecting the incoming call, muting the incoming caller or the user 102, transmitting an audio prompt to the user 102, transmitting a message to the user 102, re-routing the incoming call to a "number disconnected" message, re-routing the incoming call to a caregiver of the user 102, transmitting a message to a financial institution (e.g., via the financial institution computing system 150), transmitting a message to a third party (e.g., via the third party computing system 160), and logging information related to the incoming caller in a fraud profile. In various arrangements, the fraud intercept activity includes the performance of multiple intercept activities. For example, if a fraud trigger is detected, various components of the call intercept and fraud detection system 100 may sequentially disconnect the incoming call, transmit a message to a caregiver of the user 102, transmit a message to the financial institution computing system 150, and log the incoming caller information in a fraud profile.

Still referring to FIG. 1, the fraud analysis computing system 130 is a computing system associated with a fraud analysis service provider. In various arrangements, the fraud analysis computing system 130 is associated with the financial institution computing system 150, a software company, a consortium, or any other organization that provides fraud monitoring services. For example, in some arrangements, an organization may offer fraud monitoring via a subscription service. In some arrangements, the components of the fraud analysis computing system 130 are embodied in the financial institution computing system 150. The fraud analysis computing system 130 includes a fraud analysis network interface 132 that enables the fraud analysis computing system 130 to communicate data over the network 170 and between a fraud analysis processing circuit 134, a fraud conversation processing circuit 136, a fraud monitoring processing circuit 138, a proxy approval processing circuit 140, a fraud profile database 142, and a user database 144.

Each of the fraud analysis processing circuit 134, the fraud conversation processing circuit 136, the fraud monitoring processing circuit 138, and the proxy approval processing circuit 140 may consist of one or more processors coupled to memory. Each processor may be implemented as one or more application specific integrated circuits (ASICs), field programmable gate arrays (FPGAs), a group of processing components, or other suitable electronic processing components. The memory may be one or more devices (e.g., RAM, ROM, Flash memory, hard disk storage) for storing data and/or computer code for completing and/or facilitating the various processes described herein. The memory may be or include non-transient volatile memory, non-volatile memory, and non-transitory computer storage media. The memory may include database components, object code components, script components, or any other type of information structure for supporting the various activities and information structures described herein. The memory is communicably coupled to the processor and includes computer code or instructions for executing one or more processes described herein.

The fraud analysis processing circuit 134 is configured to utilize incoming call data routed from the call intercept client application 116 and/or the call intercept hardware device 120 to create fraud profiles that are stored in the fraud profile database 142. In various arrangements, fraud profiles may include, are not limited to, the following data known to be connected to fraud: phone numbers, the identities of individuals, exchanges or area codes, voice patterns, and questions and answers related to a "fraud script." The fraud profile database 142 is a storage device structured to retrievably store fraud profile information relating to the various operations discussed herein, and may include non-transient data storage mediums (e.g., local disc or flash-based hard drives, local network servers, and the like) or remote data storage facilities (e.g., cloud servers). In various arrangements, the fraud profile information stored in the fraud profile database 142 may be organized according to a phone number or other identifier.

The fraud analysis processing circuit 134 is further configured to compare incoming call data, which may be otherwise referred to as "envelope" data, to the data stored in the fraud profile database 142 and to assign a trust score, percentage, or other metric to the incoming call envelope data based on the degree to which the envelope data matches the data in the fraud profile database 142. For example, if every item of incoming call envelope data is stored in the same fraud profile within the fraud profile database 142, the fraud analysis processing circuit 134 will assign a 100% match score to the incoming call envelope data. In some arrangements, the fraud analysis processing circuit 134 stores a threshold match score. For example, a fraud intercept activity may be performed whenever incoming call envelope data exceeds a 50% match with information stored in the fraud profile database 142.

Still referring to FIG. 1, the fraud conversation processing circuit 136 is configured to converse with an incoming caller to determine whether the caller has a fraudulent intent. In some arrangements, an artificial intelligence entity is utilized to converse with the incoming caller. In other arrangements, the fraud conversation processing circuit 136 is configured to connect the caller with a live person that engages in conversation with the caller. At the conclusion of the conversation, the artificial intelligence entity or the live person quantifies the likelihood that the incoming caller is fraudulent via a trust score, percentage, or some other metric. For example, the metric may be based on whether the incoming caller exhibits signs of nervousness or fright, whether the incoming caller's voiceprint matches a voiceprint stored in the fraud analysis computing system 130, or whether the incoming caller speaks a certain keyword or phrase. If the metric assigned by the artificial intelligence entity or the live person violates a certain threshold (e.g., 75% likelihood the caller is fraudulent, and a system threshold is set at 60%), the fraud analysis computing system 130 performs a fraud interception activity.

The fraud monitoring processing circuit 138 of the fraud analysis computing system 130 is configured to monitor a conversation between an incoming caller and the user 102. Similar to the fraud monitoring processing circuit 122 of the call intercept client application 116 and the fraud monitoring processing circuit 126 of the call intercept hardware device 120, the fraud monitoring processing circuit 138 of the fraud analysis computing system 130 is configured to monitor the incoming call between the incoming caller and the user 102 for specified fraud triggers. In some arrangements, the fraud monitoring processing circuit 138 is configured to monitor the entire conversation between an incoming caller and the user 102. In other arrangements, the fraud monitoring processing circuit 138 only monitors conversations when a fraud trigger word or phrase has been spoken by the incoming caller or the user 102 and call data has been transmitted from the call intercept client application 116 or the call intercept hardware device 120 to the fraud analysis computing system 130. For example, if the call intercept client application 116 is actively monitoring the call and the incoming caller speaks the phrase "social security number," the call intercept client application 116 transmits call data and/or a signal to the fraud analysis computing system 130 instructing the fraud analysis computing system 130 to commence active monitoring of the call.

The proxy approval processing circuit 140 is configured to permit a caregiver, guardian, family member, or other proxy for the user 102 to control the settings, including fraud triggers and fraud intercept activities, of the fraud analysis computing system 130. As used herein, a "caregiver" of the user 102 is any person with authority, legal or otherwise, that acts in place of the user 102 to manage the user's financial and/or legal matters. For example, in some arrangements, the user 102 is elderly and the caregiver of the user 102 is the user's adult child. In other arrangements, the user 102 lacks the mental capacity to manage his or her own affairs and the caregiver of the user 102 is the user's parent, spouse, or sibling. In some arrangements, the proxy approval processing circuit 140 is configured to permit a caregiver to manage multiple users at once. For example, the caregiver may be an adult child responsible for both elderly parents, each parent having their own phone number and/or mobile device. The proxy approval processing circuit 140 permits the caregiver to link both parents' accounts to the caregiver and manage settings at once (e.g., input a blocked incoming caller to both parents' numbers).

In various arrangements, the caregiver may wish to be informed (e.g., via text message, push notification, mobile application dashboard message, phone call) each time a fraud trigger is detected in an incoming call. In other arrangements, the caregiver may wish to require the caregiver's approval before any transaction between the incoming caller, the user 102, the financial institution associated with the financial institution computing system 150 and/or the third party associated with the third party computing system 160 occurs. The caregiver's approval may include a variety of authentication techniques to verify the identity of the caregiver, including voiceprint analysis, passcode or password entry, analysis of ambient call noise to detect the caregiver's location, and biometric data entry or detection.

The user database 144 is a storage device structured to retrievably store information pertaining to the users (e.g., the user 102) of the fraud analysis computing system 130. In some arrangements, the user database 144 stores data related to incoming calls received by the user mobile device 110 and/or the user landline phone 118. This data may include, but is not limited to, the telephone number of the incoming call, the timestamp of the incoming call, and the length of the incoming call. This data may be accessible to the user 102 or the caregiver via the user interface 500, described in further detail below with reference to FIG. 5. In other arrangements, the user database 144 stores settings (e.g., fraud triggers, fraud intercept activities) that are particular to the user 102 and may be managed by the caregiver. For example, the caregiver of the user 102 may wish to block incoming calls originating from a charity that the caregiver knows the user 102 is likely to make a risky contribution to, although the charity itself is not fraudulent. In some arrangements, the caregiver accesses these settings via the user interface 400, described in greater detail below with reference to FIG. 4.

The financial institution computing system 150 is a computing system associated with an entity that provides administration of financial transactions and accounts. In various arrangements, the financial institution computing system 150 is associated with a financial institution, a software company, a consortium, or any other organization that manages financial transactions. In an example arrangement, the financial institution computing system 150 is a banking entity. In some arrangements, the financial institution computing system 150 may communicate with the fraud analysis computing system 130 when a fraud trigger is detected. For example, if the fraud analysis computing system 130 detects that the user 102 is about to make a transaction involving an account held by the user 102 at the financial institution associated with the financial institution computing system 150, the fraud analysis computing system 130 may transmit a message to the financial institution computing system 150 instructing the financial institution to cancel the transaction or wait for an approval from a caregiver of the user 102 before proceeding with the transaction.

The financial institution computing system 150 includes, among other systems, a financial institution network interface 152, a transaction analysis circuit 154, a user database 156, and a transaction database 158. The financial institution network interface 152 enables the financial institution computing system 150 to exchange information over the network 170. The transaction analysis circuit 154 analyzes data related to transactions between a user account (e.g., an account held by the user 102) and the financial institution or third party entities. For example, the fraud analysis computing system 130 may transmit a message to the financial institution computing system 150 warning of a potentially fraudulent transaction. Based on an analysis performed by the transaction analysis circuit 154, the financial institution computing system 150 may determine the transaction is actually not fraudulent, and the financial institution computing system 150 may transmit a message to the fraud analysis computing system 130 accordingly. The user database 156 stores personal user information (e.g., names, addresses, phone numbers, and so on), identification information (e.g., driver's license numbers, standard biometric data, and so on), and user financial information (e.g., token information, account numbers, account balances, available credit, credit history, transaction histories, and so on). The transaction database 158 stores information related to transactions between user accounts and other entities.

The third party computing system 160 is a computing system associated with any third party organization or entity that conducts a variety of different transactions with the user. For example, the third party computing system 160 may include, but is not limited to, a computing system maintained by a charity accepting monetary donations, a computing system associated with a social network, or a computing system associated with a governmental entity. In some arrangements, the third party computing system 160 interacts with the fraud analysis computing system 130. For example, the third party computing system 160 may provide data relating to the incoming caller (e.g., a social network computing system may provide the incoming caller's location) that is stored in the fraud profile database 142. If, as one example, the incoming caller tells the user that the incoming caller is calling from a location other than the location indicated by the incoming caller's social media accounts, the fraud analysis computing system 130 may detect the discrepancy based on data exchanged with the social network computing system 160 and trigger the performance of a fraud interception activity.

In some arrangements, the fraud analysis computing system 130 may alert the third party computing system 160 if a transaction between the user 102 and the third party associated with the third party computing system 160 should be cancelled or delayed until a caregiver of the user 102 completes his or her approval of the transaction. For example, if the transaction involves the user 102 agreeing to make a donation to a charity after a conversation with an incoming caller and the caregiver requires pre-approval all of the user's donations, the fraud analysis computing system 130 may transmit a message (e.g., via a phone call, text message, email) to the third party computing system 160 associated with the charity to warn that the transaction may be delayed or cancelled pending the caregiver's approval. In this way, the charity is notified that the donation from the user 102 should not be included in fundraising totals until the transaction is finalized with the caregiver's approval. In some arrangements, the message from the fraud analysis computing system 130 might also alert the charity that the user 102 lacks competency and thus should be removed from the charity's future telemarketing efforts.

Figure 2:
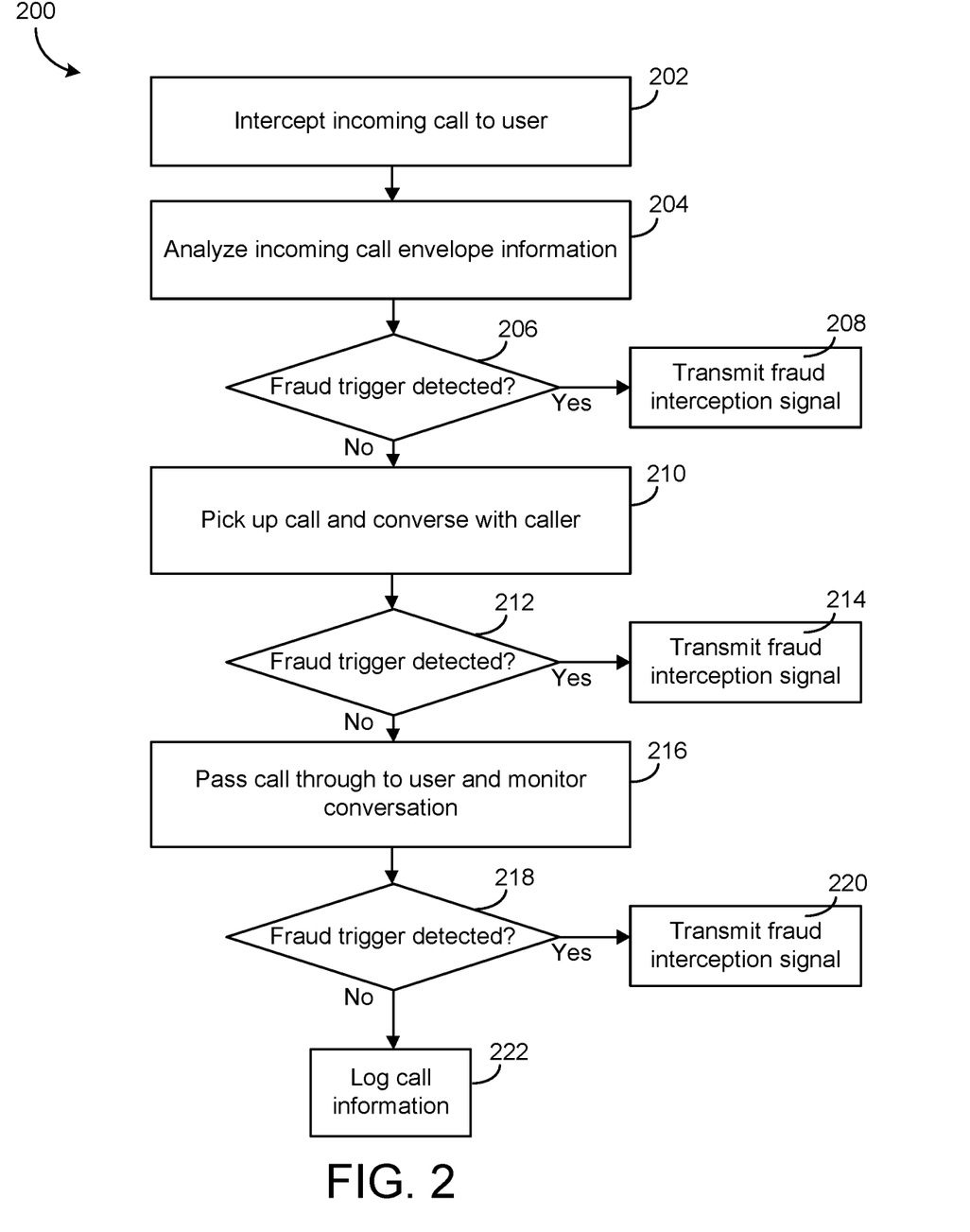
FIG. 2 is a schematic diagram of a process for monitoring and intercepting a potentially fraudulent call using the call intercept and fraud detection system shown in FIG. 1, according to an example embodiment.

Turning now to FIG. 2, a flow diagram of a method 200 for intercepting and monitoring a potentially fraudulent call is shown according to an example embodiment. In some arrangements, the method 200 is performed using the call intercept and fraud detection system 100 shown in FIG. 1. In particular, the method 200 may be at least partially performed using the fraud analysis processing circuit 134, the fraud conversation processing circuit 136, and the fraud monitoring processing circuit 138 of the fraud analysis computing system 130. An incoming call to the user mobile device 110 or the user landline phone 118 is intercepted at 202. In some arrangements, the incoming call is intercepted by the fraud analysis computing system 130. In some arrangements, the call interception is accomplished when the call intercept client application 116 or the call intercept hardware device 120 routes the incoming call to the fraud analysis computing system 130 via the network 170.

Envelope data associated with the incoming call is analyzed by the fraud analysis processing circuit 134 at 204. In various arrangements, envelope data includes, but is not limited to, the incoming phone number, the identity of an individual or an entity associated with the incoming phone number, and the area code of the incoming phone number. A determination of whether the incoming call envelope data constitutes a fraud trigger is performed by the fraud analysis processing circuit 134 at 206. In some arrangements, step 206 includes a comparison of the envelope data with fraud profile data stored in the fraud profile database 142. If the degree to which the envelope data matches fraud profile data exceeds a specified threshold (e.g., >50% match), the fraud analysis processing circuit 134 detects a fraud trigger. In other arrangements, step 206 may also include a comparison of the envelope data with user setting data stored in the user database 144. For example, the fraud analysis processing circuit 134 may determine that the incoming call envelope data matches a caregiver-entered setting (e.g., the incoming call envelope data matches data related to a charity in which the caregiver wishes to monitor or restrict user transactions).

If a fraud trigger is detected, a fraud interception activity is completed at 208. In some arrangements, the fraud interception activity is performed by the fraud analysis computing system 130 and includes routing the incoming call to a "number disconnected" message that serves to both prevent the incoming caller from speaking with the user 102 and discourage the incoming caller from contacting the user 102 again. In other arrangements, the fraud interception activity includes informing a caregiver and requiring the caregiver to provide approval before the incoming call passes to the next fraud check.

If the fraud analysis processing circuit 134 determines that the call envelope data does not trigger detectable fraud, the method 200 proceeds to picking up the incoming call and conversing with the incoming caller at 210. In some arrangements, picking up the call and conversing with the incoming caller is performed by the fraud conversation processing circuit 136. As described above with reference to FIG. 1, the conversation may occur between the incoming caller and an artificial intelligence entity or a live person. At the conclusion of the conversation, the artificial intelligence entity or the live person assigns a trust metric, score, or percentage to the incoming caller.

Detection of whether the trust metric, score, or percentage implicates a fraud trigger occurs at 212. In some arrangements, this detection is performed by the fraud conversation processing circuit 136. For example, if the metric assigned to the incoming caller exceeds a certain specified threshold, the fraud analysis computing system 130 completes a fraud interception activity at 214. In some arrangements, the fraud interception activity might include routing the incoming call to a "number disconnected" message. In other arrangements, the fraud interception activity might include storing a voiceprint of the incoming caller in the fraud profile database 142, where the data is accessible to all subscribers to the fraud analysis computing system 130. In other words, once one subscriber (e.g., the user 102) of the fraud analysis computing system 130 receives a call from an incoming caller that is determined to be fraudulent, that incoming caller is tagged as fraudulent for every other subscriber to the fraud analysis computing system 130.

However, if the fraud conversation processing circuit 136 does not detect a fraud trigger at 212, the call is passed through to either the user mobile device 110 or the user landline phone 118 at 216. In some arrangements, the call is passed on by the fraud analysis computing system 130 and received by the fraud monitoring processing circuit 122 of the call intercept client application 116, or the fraud monitoring processing circuit 126 of the call intercept hardware device 120. Detection of a fraud trigger is performed by either the fraud monitoring processing circuit 122, the fraud monitoring processing circuit 126, or the fraud monitoring processing circuit 138 at 218. In some arrangements, the fraud trigger detected at 218 includes the incoming caller or the user 102 speaking a word or phrase that is often associated with fraudulent or risky activity. In other arrangements, the fraud trigger detected at 218 includes the fraud analysis computing system 130 detecting a match between data generated by the incoming caller (e.g., an incoming caller voiceprint, incoming call envelope information) and data stored in a fraud profile of the fraud profile database 142. If a fraud trigger is detected, a signal is transmitted to complete a fraud intercept activity at 220. In some arrangements, the signal to complete the fraud intercept activity is transmitted by the fraud analysis computing system 130 and includes instructions to complete multiple intercept activities (e.g., muting the incoming caller, transmitting a message to a caregiver of the user 102, and logging incoming caller data in the fraud profile database 142).

If, however, no fraud trigger is detected during the conversation between the incoming caller and the user 102, the method 200 concludes by logging call information (e.g., incoming call number, incoming caller identity, call duration) in the user database 144 at 222. This call information is accessible via the user interface 500, described in further detail below with reference to FIG. 5. In some arrangements, if no fraud is detected at any point upon receipt of the incoming call, the fraud analysis computing system 130 stores information relating to the incoming caller to boost the trust score or metric associated with the incoming caller. For example, if an extensive call history stored in the fraud profile database 142 indicates that an incoming caller is legitimate, the method 200 may skip certain fraud detection steps (e.g., steps 210-214) to pass the incoming caller to the user 102 more quickly.

Figure 3:
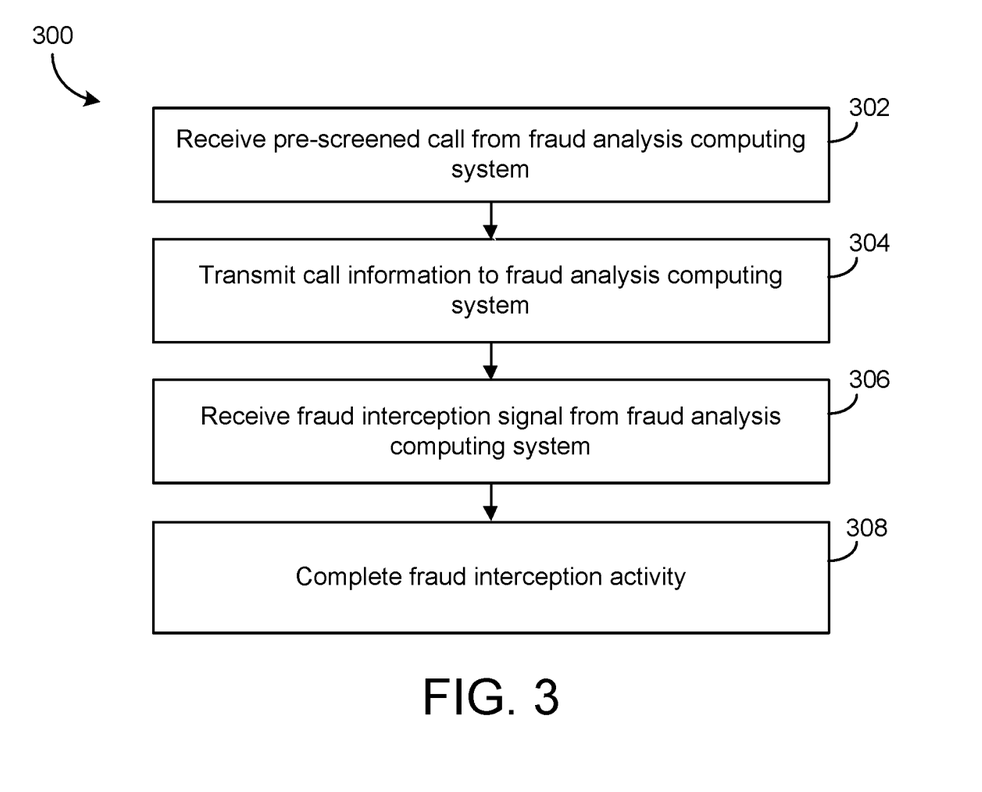
FIG. 3 is another schematic diagram of a process for monitoring and intercepting a potentially fraudulent call using the system shown in FIG. 1, according to an example embodiment.

Turning now to FIG. 3, a flow diagram of a method 300 for monitoring a call for fraud is shown according to an example embodiment. In some arrangements, the method 300 is performed using the call intercept and fraud detection system 100 shown in FIG. 1. In particular, the method 300 may be at least partially performed by either the call intercept client application 116 or the call intercept hardware device 120, depending on whether the incoming call is received by a phone number associated with a mobile phone (e.g., the user mobile device 110) or a landline phone (e.g., the user landline phone 118). A pre-screened call is received by the call intercept application 116 or the call intercept device 120 at 302. In some embodiments, the fraud analysis computing system 130 transmits the pre-screened call after completing multiple preliminary filtering steps (e.g., steps 202-212, described above with reference to FIG. 2).

The user 102 begins to converse with the incoming caller at 304. During the conversation, the fraud monitoring processing circuit 122 of the application 116 or the fraud monitoring processing circuit 126 of the device 120 monitors and transmits call information to the fraud analysis computing system 130. In some arrangements, the application 116 or the device 120 transmits a real time recording of the entire call to the fraud monitoring processing circuit 138 of the fraud analysis computing system 130 for active monitoring by the fraud monitoring processing circuit 138. In other arrangements, the application 116 or the device 120 refrains from transmitting call information to the fraud monitoring processing circuit 138 until a certain fraud trigger is detected. In other words, the fraud monitoring processing circuit 122 or the fraud monitoring processing circuit 126 performs active monitoring of the incoming call. For example, if either the incoming caller or the user 102 speak a phrase that may be indicative of fraudulent activity (e.g., "password," "PIN," "social security number"), the application 116 or the device 120 may begin to transmit a real time recording of the call to the fraud monitoring processing circuit 138.

Still referring to FIG. 3, a fraud interception signal is received by the application 116 or the device 120 via the network 170 at 306. In some arrangements, the fraud interception signal is received from the fraud monitoring processing circuit 138. In some arrangements, and as described in steps 218 and 220 above with reference to FIG. 2, the fraud monitoring processing circuit 138 transmits a fraud interception signal in response to the detection of a fraud trigger according to data and settings stored in the fraud profile database 142 and the user database 144. After receiving the fraud interception signal, a fraud interception activity is completed as directed by the fraud interception signal at 308. In some arrangements, the fraud interception activity includes the application 116 or the device 120 disconnecting the call or re-routing the call (e.g., to a caregiver, to a financial advisor employed by the financial institution associated with the financial institution computing system 150). In some arrangements, the fraud interception activity includes the application 116 or the device 120 transmitting call data to the fraud analysis computing system 130. For example, the application 116 or the device 120 may transmit a voiceprint of the incoming caller to the fraud analysis computing system 130 to be stored in the fraud profile database 142.

Figure 4:
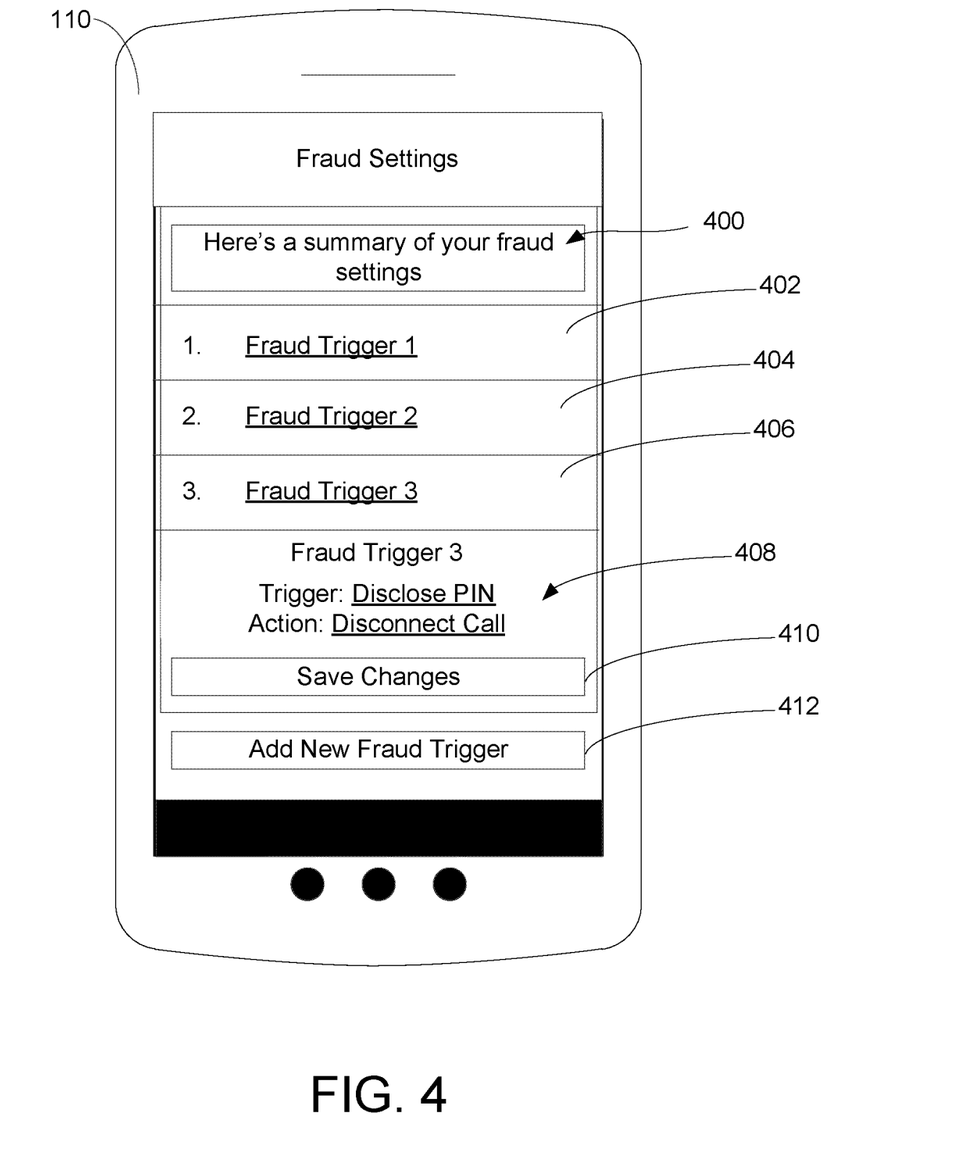
FIG. 4 is a schematic diagram of a call intercept client application user interface, according to an example embodiment.

Referring now to FIG. 4, a user interface 400 is shown, according to an example embodiment. While the interface 400 is shown to be presented to the user 102 via the user mobile device 110, it should be understood that a similar interface may also be accessible as a cloud service via any suitable internet browser. The interface 400 may be presented to the user 102 or a caregiver to configure settings related to the user's account and/or profile that are stored in the user database 144 of the fraud analysis computing system 130. In the example shown, the interface 400 includes a first fraud trigger entry 402, a second fraud trigger entry 404, and a third fraud trigger entry 406. Each of the fraud trigger entries 402-406 may describe a separate fraud trigger and subsequent intercept action if the fraud trigger is detected during an incoming call to the user in accordance with the methods described herein.

In some arrangements, the fraud trigger entries 402-406 include hyperlinks to open an entry-specific window 408. The entry-specific window 408 includes information for the user 102, the caregiver, or another proxy related to the fraud trigger. As shown, this information may include, but is not limited to the fraud trigger (i.e., a request to disclose a user PIN) and the intercept action to take in response to the fraud trigger (i.e., disconnect the incoming call). In some arrangements, the user 102 or the caregiver can modify the fraud trigger and/or the intercept action taken in response to the fraud trigger by clicking on a button or hyperlink within the entry-specific window 408. The entry-specific window 408 is further shown to include a button or a hyperlink 410 to save any changes made to the fraud trigger entry.

In some arrangements, the user interface 400 includes an additional button or a hyperlink 412 that permits a user 102 or a caregiver to add a new fraud trigger entry. For example, a caregiver may wish to block a certain phone number from making calls to the user 102, whether or not the phone number is associated with a fraudster. For example, if a caregiver knows that a certain charity is likely to call the user 102 and the user 102 is no longer competent to handle the user's financial affairs independently, the caregiver may choose to block incoming calls to the user 102 made by the charity. In other arrangements, the caregiver may select that any calls made from a certain number to the user 102 are instead re-routed to the caregiver by the fraud analysis computing system 130, so that the caregiver may provide approval for the user 102 to receive the call or so that the caregiver can monitor the call between the incoming caller and the user 102.

Figure 5:
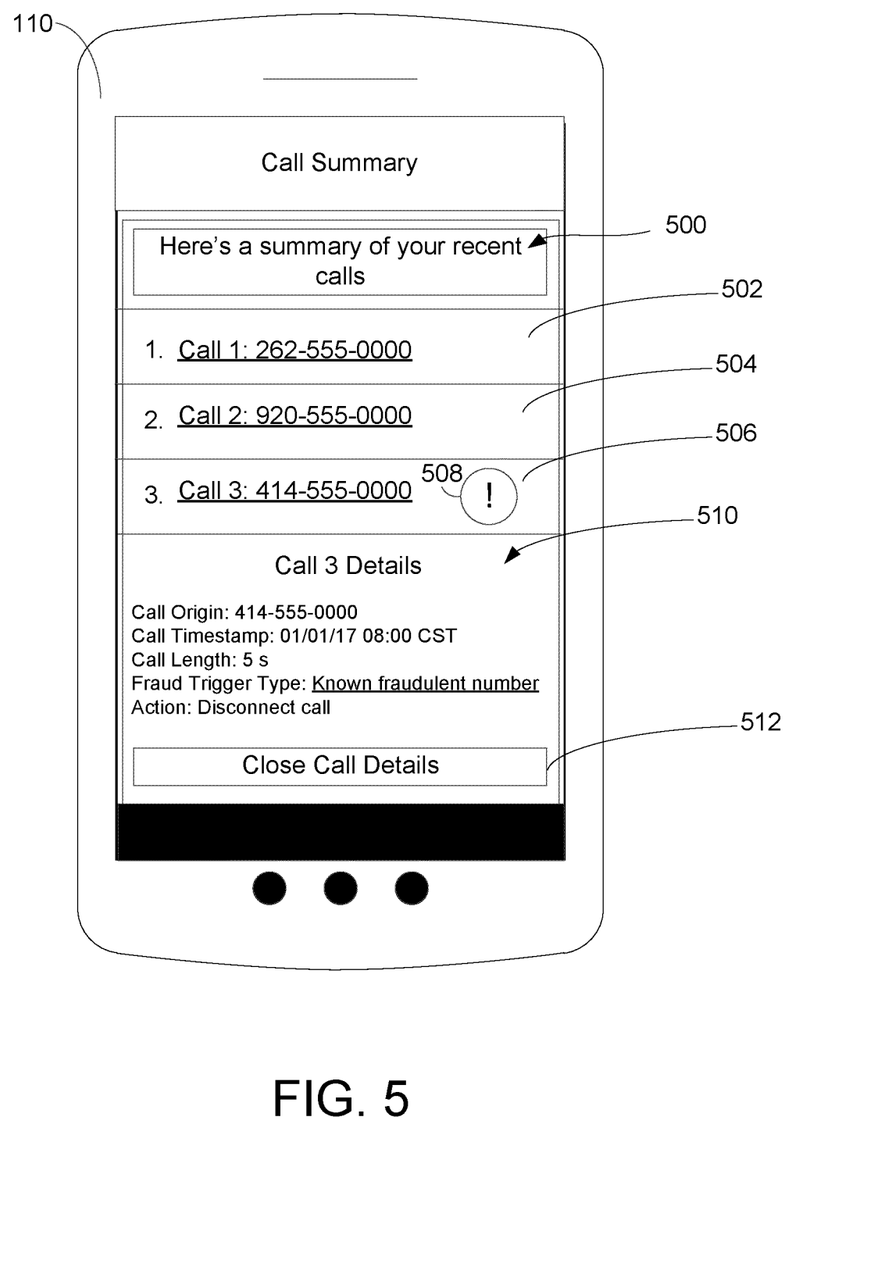
FIG. 5 is another schematic diagram of a call intercept client application user interface, according to an example embodiment.

Referring now to FIG. 5, another user interface 500 is shown, according to an example embodiment. While the interface 500 is shown to be presented to the user 102 via the user mobile device 110, it should be understood that a similar interface may also be accessible as a cloud service via any suitable internet browser. The interface 500 may be presented to the user 102 or a caregiver that wishes to review a summary of recent incoming calls made to either the user mobile device 110 or the user landline phone 118. In the example shown, the interface 500 includes a first call entry 502, a second call entry 504, and a third call entry 506. In some arrangements, the call entries 502-506 displayed in the interface 500 are based on data stored in the user database 144 of the fraud analysis computing system 130 and accessed via the network 170.

Each of the call entries 502-506 is representative of an incoming call to the user 102 and may include a display of the incoming call number. In some arrangements, the incoming call number may be a hyperlink that opens a call entry-specific window 510 that displays further details regarding the incoming call. As shown, the call entries 502-506 may also include a fraud indicator 508 that is displayed if the fraud analysis computing system 130 detected a fraud trigger at some point during the call while performing a fraud detection process (e.g., method 200, described above with reference to FIG. 2).

By clicking on the hyperlink for the third call entry 506, the call entry-specific window 510 is opened, displaying information about the incoming call and the fraud trigger that was detected by the fraud analysis computing system 130. As shown, information displayed in the entry-specific window 510 includes, but is not limited to, the incoming call number, a timestamp of when the incoming call was received, the length of the incoming call, the type of fraud trigger detected in the incoming call (i.e., the number was determined to be fraudulent based on data retrieved from the fraud profile database 142 of the fraud analysis computing system 130), and the action taken by the fraud analysis computing system 130 in response to the detection of the fraud trigger (i.e., disconnect the call). In various arrangements, the call information displayed in entry-specific window 510 includes a hyperlink that the user 102 or the caregiver can click on to retrieve further information. For example, the fraud trigger information may include a hyperlink to view a relevant fraud profile stored in the fraud profile database 142. To close the entry-specific window 510, the user 102 or the caregiver may click on the button 512.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U. S. C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A fraud analysis computing system, comprising:
   a network interface configured to communicate data over a network; and
   a processing circuit comprising one or more processors coupled to non-transitory memory, wherein the processing circuit is configured to:
   intercept an incoming call to a user from an incoming caller;
   analyze incoming call envelope information associated with the incoming call prior to transferring the incoming call to at least one of a user mobile device or a user landline telephone device;
   determine that the incoming call envelope information does not match fraud profile information stored in a fraud profile database;
   after no match is determined, transfer the incoming call to at least one of the user mobile device or the user landline telephone device;
   monitor incoming call data generated during an incoming call conversation between the user and the incoming caller, the incoming caller acting during the incoming call to conceal or misrepresent an identity of the incoming caller, the monitored incoming call data comprising data about specific spoken words or phrases contained in the call conversation;
   detect a fraud trigger within the incoming call data, the fraud trigger comprising a spoken word or phrase associated with a fraudulent or risky activity; and
   complete a fraud interception activity in response to the detection of the fraud trigger.

2. The fraud analysis computing system of claim 1, wherein the incoming call envelope information comprises at least one of a phone number, an identity of an individual or an entity associated with the phone number, or an area code.

3. The fraud analysis computing system of claim 1, wherein the word or the phrase associated with a fraudulent or a risky activity comprises at least one of: social security number, SSN, personal identification number, PIN, account number, routing number, credit card number, debit card number, Internal Revenue Service, IRS, government authorized store, tax payment, immediate payment, you owe, you must pay, forcefully recover, frozen, confiscated, garnished, seized, crime, maximum sentence, maximum penalty, arrest warrant, jail, sheriff, you have won, gift card, or opportunity of a lifetime.

4. The fraud analysis computing system of claim 1, wherein the fraud interception activity comprises at least one of muting the user, transmitting a message to the user, transmitting an audio prompt to the user, disconnecting the incoming call, transmitting a message to a financial institution computing system, transmitting a message to a third party computing system, or transmitting a message to a caregiver of the user.

5. The fraud analysis computing system of claim 4, wherein transmitting a message to a caregiver of the user includes requiring the caregiver's approval before completing a transaction between the incoming caller and the user.

6. The fraud analysis computing system of claim 5, wherein requiring the caregiver's approval includes authenticating the identity of the caregiver, and wherein authenticating the identity of the caregiver includes at least one of voiceprint analysis, passcode or password entry, analysis of ambient noise to detect the caregiver's location, or biometric data entry or detection.

7. A computer-implemented method comprising:
intercepting, by the fraud analysis system, an incoming call to a user from an incoming caller;
analyzing, by the fraud analysis system, incoming call envelope information associated with the incoming call prior to transferring the incoming call to at least one of a user mobile device or a user landline telephone device;
determining, by the fraud analysis system, that the incoming call envelope information does not match fraud profile information stored in a fraud profile database;
after no match is determined, transferring, by the fraud analysis system, the incoming call to at least one of the user mobile device or the user landline telephone device;
monitoring, by a fraud analysis computing system, incoming call data generated during an incoming call conversation between the user and the incoming caller, the incoming caller acting during the incoming call to conceal or misrepresent an identity of the incoming caller, the monitored incoming call data comprising data about specific spoken words or phrases contained in the call conversation;
detecting, by the fraud analysis computing system, a fraud trigger within the incoming call data, the fraud trigger comprising a spoken word or phrase associated with a fraudulent or risky activity; and
completing, by the fraud analysis computing system, a fraud interception activity in response to detection of the fraud trigger.

8. The computer-implemented method of claim 7, wherein the incoming call envelope information comprises at least one of a phone number, an identity of an individual or an entity associated with the phone number, or an area code.

9. The computer-implemented method of claim 7, wherein the word or the phrase associated with a fraudulent or a risky activity comprises at least one of: social security number, SSN, personal identification number, PIN, account number, routing number, credit card number, debit card number, Internal Revenue Service, IRS, government authorized store, tax payment, immediate payment, you owe, you must pay, forcefully recover, frozen, confiscated, garnished, seized, crime, maximum sentence, maximum penalty, arrest warrant, jail, sheriff, you have won, gift card, or opportunity of a lifetime.

10. The computer-implemented method of claim 7, wherein the fraud interception activity comprises at least one of muting the user, transmitting a message to the user, transmitting an audio prompt to the user, disconnecting the incoming call, transmitting a message to a financial institution computing system, transmitting a message to a third party computing system, or transmitting a message to a caregiver of the user.

11. The computer-implemented method of claim 7, wherein transmitting a message to a caregiver of the user includes requiring the caregiver's approval before completing a transaction between the incoming caller and the user.

12. The computer-implemented method of claim 11, wherein requiring the caregiver's approval includes authenticating the identity of the caregiver, and wherein authenticating the identity of the caregiver includes at least one of voiceprint analysis, passcode or password entry, analysis of ambient noise to detect the caregiver's location, or biometric data entry or detection.

13. A call intercept hardware device configured to couple to a landline telephone device and a telephone jack, comprising:
a network interface configured to communicate data over a network; and
a processing circuit comprising one or more processors coupled to non-transitory memory, wherein the processing circuit is configured to:
intercept an incoming call to a user from an incoming caller;
analyze incoming call envelope information associated with the incoming call prior to transferring the incoming call to at least one of a user mobile device or a user landline telephone device;
determine that the incoming call envelope information does not match fraud profile information stored in a fraud profile database;
after no match is determined, transfer the incoming call to the landline telephone device;
monitor incoming call data generated during an incoming call conversation between the user and the incoming caller, the incoming caller acting during the incoming call to conceal or misrepresent an identity of the incoming caller, the monitored incoming call data comprising data about specific spoken words or phrases contained in the call conversation;
detect a fraud trigger within the incoming call data, the fraud trigger comprising a spoken word or phrase associated with a fraudulent or risky activity; and
transmit the incoming call data to a fraud analysis computing system in response to the detection of the fraud trigger.

14. The call intercept hardware device of claim 13, wherein the processing circuit is further configured to:
receive a fraud interception signal from the fraud analysis computing system; and
complete a fraud interception activity in response to receipt of the fraud interception signal.

15. The call intercept hardware device of claim 13, wherein the word or the phrase associated with a fraudulent or a risky activity comprises at least one of: social security number, SSN, personal identification number, PIN, account number, routing number, credit card number, debit card number, Internal Revenue Service, IRS, government authorized store, tax payment, immediate payment, you owe, you must pay, forcefully recover, frozen, confiscated, garnished, seized, crime, maximum sentence, maximum penalty, arrest warrant, jail, sheriff, you have won, gift card, or opportunity of a lifetime.

* * * * *